United States Patent [19]
Weiner

[11] 3,750,072
[45] July 31, 1973

[54] APPARATUS FOR INSULATING ADJACENT COILS IN AN ELECTRICAL COIL FORMER

[76] Inventor: Norbert Weiner, 5275 Bergneustadt-2, Pernze, Germany

[22] Filed: Dec. 29, 1971

[21] Appl. No.: 213,373

[30] Foreign Application Priority Data
Jan. 30, 1971  Germany.................. P 21 04 421.3

[52] U.S. Cl..................... 336/185, 336/65, 336/208
[51] Int. Cl. ........................................... H01f 27/30
[58] Field of Search..................... 330/208, 185, 65, 330/90, 100

[56] References Cited
UNITED STATES PATENTS
1,242,497  10/1917  Torchio .......................... 336/185 X
1,665,947  4/1928  Brennan.......................... 336/185 X
3,544,937  12/1970  Boysen.............................. 336/208

Primary Examiner—E. A. Goldberg
Attorney—Allison C. Collard

[57] ABSTRACT

A coil former having a plurality of winding spools for electrical coils in which adjacent coils are insulated from each other by an annular insulating wall having perpendicular edges disposed over the ends of the winding spools to provide a high dielectric strength between the coils. Rectangular shaped insulating caps disposed over the top and bottom edges of the spools are also used for conventional coil former applications, while side shields slidably disposed over the side edges of the spools are sued with printed circuit boards.

8 Claims, 6 Drawing Figures

PATENTED JUL 31 1973 3,750,072

APPARATUS FOR INSULATING ADJACENT COILS IN AN ELECTRICAL COIL FORMER

The present invention relates to coil formers, and in particular to electrical coil formers having a plurality of winding chambers in which coils are wound which are formed by a plurality of cylindrical-shaped winding spools disposed within the coil former.

Coil formers of the type disclosed herein are well known in the prior art. These coil formers, however, are disadvantageous since the coil windings thereof are separated only by the flanges on the winding spools in the winding chambers, and hence a very small arc or creep path exists between the adjacent coils. These coil formers also include mechanical couplers comprising an internal tube and an external sleeve.

Attempts have been made to overcome the above-described difficulties. For example, non-conductive frames having an outwardly-extending annular wall have been used. These insulating frames, however, do not increase the electrical insulation between adjacent winding chambers, and, furthermore, are mechanically weak. The coils in other formers have been impregnated and sealed with non-conductive material, or wrapped in sheets of electrical insulation material. Such coils, however, require much extra work during their manufacture, and their fabrication entails additional expense.

It is therefore an object of the present invention to provide an electric coil former in which the dielectric strength of adjacent wound coils in the coil former is at least 8,000 volts, and in which such a dielectric strength is achieved without any special manufacturing process.

Accordingly, the present invention provides an electrical coil former which includes an insulating frame comprising an annular wall having at least one jacket sleeve or flange positioned perpendicular to the wall and having an inner contour that is identical to the external shape of the flanges. The insulating frame is disposed between any two adjacent winding chambers over the ends of the winding spools. In one embodiment of the present invention, the insulating frame is provided with two jacket sleeves disposed perpendicular to the annular wall. The insulating frame, thus, is disposed over the ends of two adjacent winding spools and electrically separates the adjacent winding chambers from one another. The arc or creep distance between any two adjacent windings is, thus, at least equal to the length of the jacket sleeves on the insulating frame. As a result, a relatively large arc distance is provided, since the annular wall of the insulating frame prevents a direct arc path between the side flanges of adjacent winding spools. Rectangular-shaped caps, which are slidably disposed over the top and bottom of the adjacent winding spools, lengthen the arcpath and thus increase the insulation between adjacent coils.

The present invention has a test dielectric strength of up to 16,000 volts, and, thus, all test requirements can be met without sealing or wrapping the coil windings with electrical insulating material. Thus, the coil former of the present invention is easily manufactured, and the insulating frame thereof further ensures a firm mechanical coupling between adjacent winding chambers, since the ends of the winding spools are slidably disposed in the jacket sleeves of the insulating frame.

In another embodiment of the invention, in which the coil former is utilized with printed circuits, U-shaped side shields are disposed over the side edges of the winding spools to increase the arc path. Side shields are used instead of caps since the connecting pins used to couple the coils to the printed circuit board prevent their use. This embodiment of the invention has the same advantages over conventional coil formers as the previously described embodiment.

It is also an object of the present invention to provide a coil former which is simple in design, easy to manufacture, and efficient and reliable in operation.

Other objects and features of the present invention will become apparent from the following detailed description taken in connection with the accompanying drawings which disclose several embodiments of the invention. It is to be understood, however, that many changes and modifications may be made thereunto without departing from the spirit and scope of the invention.

In the drawings, wherein similar reference numerals denote similar elements throughout the several views.

Figure 3:
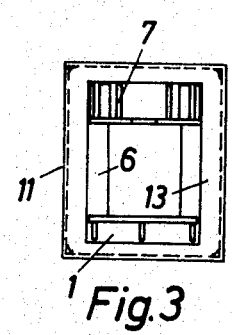
FIG. 3 is a side view of the coil former illustraded in FIG. 1.
Figure 1:
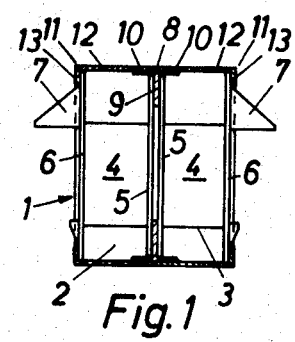
FIG. 1 is a partial, cross-sectional side view of one embodiment of a coil former constructed in accordance with the present invention.

Referring to the drawings, there is shown a coil former 1 having two winding chambers 2 and 3, each of which has a winding spool disposed therein comprising a cylindrical core portion 4 which serves as a winding support and two end flanges 5 and 6. Flanges 6 also comprise the end flanges of the coil former. Disposed on end flanges 6 are connecting plate members 7 for coupling the coils to connecting pins or terminals. Winding chambers 2 and 3 have a rectangular, cross-sectional shape.

Figure 2:
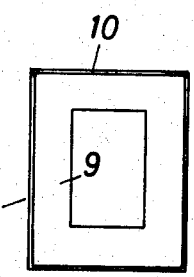
FIG. 2 is a side view of the insulating frame.

As shown in FIG. 2, insulating frame 8 comprises an annular wall 9 and jacket sleeves 10 perpendicular thereto on both sides of the wall. Insulating frame 8 also has a rectangular cross-sectional shape, and the inner contour of the jacket sleeves 10 is identical with the external configuration of flanges 5. A pair of slip-on caps 11, which include a rectangular jacket and an inwardly directed edge 13, are also provided. Rectangular jackets 12 are disposed over jacket sleeves 10 and the ends of flanges 5 and 6. The outer contour of end flanges 6 is the same as the outer shape of jacket sleeve 10, since end flanges 6 are slightly larger in size than flanges 5.

To assemble the coil former of the present invention, winding chambers 2 and 3 are wound separately, i.e. provided with a primary winding on one side and a secondary winding on the other side. These coils are not shown in the drawing. The winding spools are then inserted into winding chambers 2 and 3 and insulating frame 8, being guided by flanges 5. Caps 11 are then slidably disposed over both ends of the coil former. Insulating frame 8 ensures a large arc distance between the primary and secondary windings, which is at least equal to the axial length of jacket sleeves 10, since an arc path cannot close directly across flanges 5 through annular wall 9 of insulating frame 8. The arc path around insulating frame 8 is so large that a dielectric strength of approximately 16,000 volts can be obtained between the primary and secondary windings. Furthermore, slip-on caps 11 insulate the windings from the surrounding air space and core laminations, and at the same time protect the coil assembly.

Figure 5:
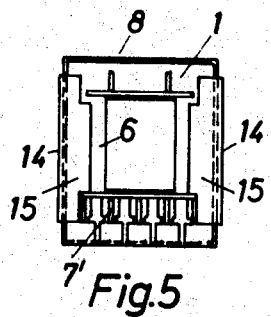
FIG. 5 is a front view of the coil former illustrated in FIG. 4.
Figure 4:
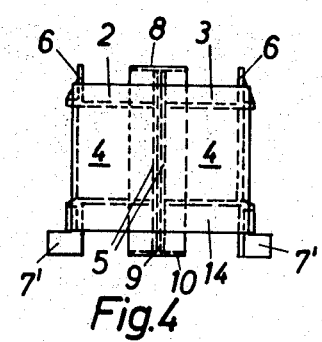
FIG. 4 is a side view of another embodiment of a coil former constructed in accordance with the present invention.
Figure 6:
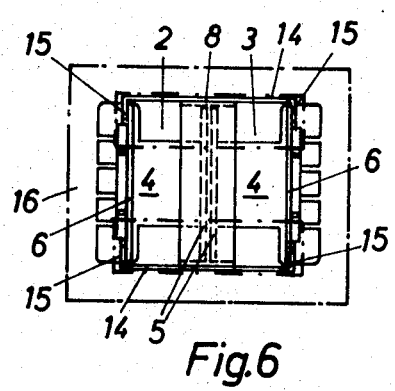
FIG. 6 is a top planar view of the coil former illustrated in FIG. 4.

The embodiment of the invention illustrated in FIGS. 4 to 6 is a coil former for use with printed circuits. In this embodiment, winding chambers 2 and 3 and insulating frame 8 are the same as in the previously described embodiment. Connecting plates 7' are provided on the ends of flanges 6 for coupling the coils to a printed circuit board. These connecting plate members prevent the use of the slip-on caps described in the previous embodiment because of their position in end flanges 6. However, side shields 14 having perpendicular clamping tongues 15 are provided instead. The height of the side shields is approximately equal to the height of end flanges 6 and their length is approximately equal to the length of the coil former. Clamping tongues 15 extend over the end flanges 6 to secure the side shields. In FIG. 6, core laminations 16 are illustrated in schematic flow form. Side shields 14 insulate the windings from core laminations 16, and insulating frame 8 insulates the primary and secondary windings from each other.

Side shields 14 can also be integrally formed with insulating frame 8 so that the side shields, and frame clamping tongues are manufactured as a one-piece, injection-moulded component. The winding spools are then inserted into the insulating frame after winding.

The insulating frame, side shields, and caps may be constructed of any suitable electrical insulation material, such as, for example, plastic.

It should be noted that, although the invention has been described and explained with reference to a coil former having two winding chambers and spools, coil formers having a larger number of winding chambers and spools may also be used. Any two adjoining winding chambers would be insulated from each other by an insulating frame of the type described above. Furthermore, frame 8 may have flanges 10 disposed on one or both of its sides, as described.

While only several embodiments of the present invention have been shown and described, it will be obvious to those persons skilled in the art that many changes and modifications may be made thereunto without departing from the spirit and scope of the invention.

What is claimed is:

1. In a coil former, having a plurality of adjacent winding chambers for electrical coils in which winding spools comprising a cylindrical core portion and a pair of end flanges are disposed for winding the coils, apparatus for insulating adjacent coils from one another, comprising:
a rigid, electrical insulating member, having at least one edge affixed perpendicular thereto about its periphery, for forming an annular-shaped sleeve for disposal over at least one of the end flanges of one of the winding spools, said sleeve having an inner contour which is substantially the same as the external shape of the end flange over which it is disposed, for insulating adjacent coils in the coil former, and thereby increasing the dielectric strength of the coil former.

2. The apparatus as recited in claim 1, wherein said insulating member further comprises an additional edge affixed perpendicular to said member about its periphery opposite said edge affixed to said member for forming an additional annular-shaped sleeve for disposal over at least one of the end flanges of one of the winding spools, said additional sleeve having an inner contour which is substantially the same as the external shape of the end flanges over which it is disposed, for providing additional insulation between adjacent coils in the coil former, and thereby increasing the dielectric strength of the coil former.

3. The apparatus as recited in claim 2, further comprising at least one insulating means, slidably disposed over adjacent ends of the flanges of the winding spools perpendicular to said insulating member, for additionally insulating adjacent coils in the coil former from each other and increasing the dielectric strength of the coil former.

4. The apparatus as recited in claim 2, further comprising at least one U-shaped electrical insulating member, slidably disposed over the side edges of the flanges of adjacent winding spools in the coil former, for additionally insulating adjacent coils in the coil former from each other and increasing the dielectric strength of the coil former.

5. The apparatus as recited in claim 2, wherein said insulating member is a rectangular-shaped frame.

6. The apparatus as recited in claim 3, wherein said insulating means are rectangular-shaped caps.

7. The apparatus as recited in claim 4, wherein said U-shaped insulating members are rectangular-shaped.

8. The apparatus as recited in claim 4, wherein said U-shaped insulating members are integrally formed with said rigid insulating member and disposed perpendicular thereto.

* * * * *